M. M. WELLS.
Forks and Grain Rakes.

No. 136,347.            Patented Feb. 25, 1873.

Witnesses:
E. W. Bates
G. E. Clapham

Inventor:
Marcus M. Wells
Chipman Hosmer & Co.
Attys.

UNITED STATES PATENT OFFICE.

MARCUS M. WELLS, OF HARTWICK, NEW YORK.

IMPROVEMENT IN FORKS AND GRAIN-RAKES.

Specification forming part of Letters Patent No. 136,347, dated February 25, 1873.

*To all whom it may concern:*

Be it known that I, MARCUS M. WELLS, of Hartwick, in the county of Otsego and State of New York, have invented a new and valuable Improvement in Fork and Grain-Rake; and I do hereby declare that the following is a full, clear, and exact description of the construction and operation of the same, reference being had to the annexed drawing making a part of this specification, and to the letters and figures of reference marked thereon.

Figure 1:
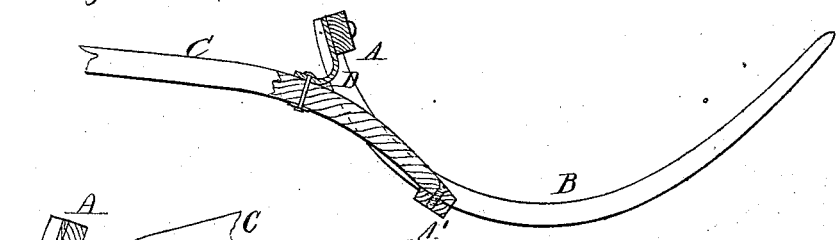
Figure 3:
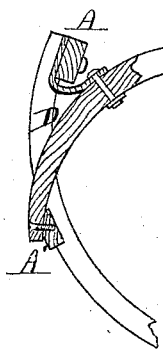
Figure 2:
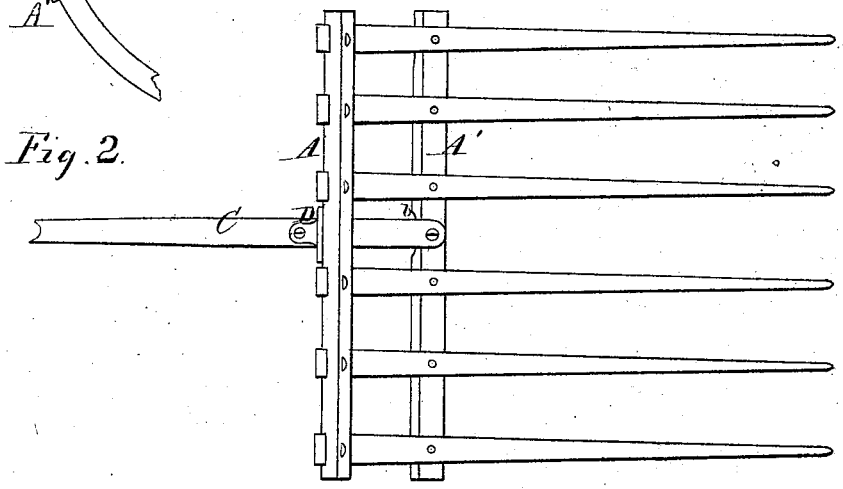

Figure 1 of the drawing is a representation of a sectional view, showing attachment of a tooth. Fig. 2 is a plan view, and Fig. 3 is a detail in section.

This invention has relation to that class of grain-rakes in which the curved teeth are so extended as to form a platform upon which the grain may be conveniently bound; and it consists in the construction and novel arrangement of a curved reversible handle, by properly changing the position of which the implement may be made available as a grain-rake or grain-fork at pleasure, substantially as hereinafter more fully described.

Referring to the drawing, A A' designate the two cross-bars, to which are attached the long curved teeth or fingers B, the bar A being secured to the end of the concave side, and the bar A' to the convex side of said teeth at a distance from the end. The space between the two bars on the under side of the implement includes the platform upon which the raked grain may be bound. C designates the handle, having its lower end curved, as shown, and having attached to its convex side a bent ear, D, provided with two screw-holes.

When the implement is to be used as a rake the end of the handle is passed under the bar A and secured to the top of the bar A', the convex side of the curved part of the handle being uppermost. The upper plate of the bent lug will then lie back over and upon the top of the bar A, to which it may be rigidly secured.

To adapt the implement to use as a grain-fork the end of the handle and the top plate of the lug are removed from bars A A'. The handle is then inverted, the end placed over the bar A' and secured to it, and the plate of the lug, the outer surface of which rests on the bar A, rigidly secured to the latter. The ear D, by being bent a little more than ordinary, may be attached to the under side of the bar A. To enable the handle to be nicely fitted to the bar A' a notch, *b*, should be cut, as shown, in the middle part of the latter.

What I claim as new, and desire to secure by Letters Patent, is—

The reversible handle C, having attached to its convex side the bent lug D, secured in reversed positions to the bars A A', substantially in the manner as specified, and for the purpose set forth.

In testimony that I claim the above I have hereunto subscribed my name in the presence of two witnesses.

MARCUS M. WELLS.

Witnesses:
ORLO BURCH, Jr.,
HENRY ADAMS.